United States Patent
Taguchi et al.

(10) Patent No.: US 7,508,229 B2
(45) Date of Patent: Mar. 24, 2009

(54) METHOD AND DEVICE FOR TESTING ARRAY SUBSTRATE

(75) Inventors: Tomoyuki Taguchi, Kusatsu (JP);
Yoshinori Mekata, Moriyama (JP);
Shunichi Komatsu, Kouga-gun (JP);
Hiroki Nishiyama, Hikone (JP);
Tsukasa Iwami, Ohmihachiman (JP)

(73) Assignees: International Business Machines Corporation, Armonk, NY (US); CMO Japan, Co., Ltd., Tokyo (JP)

( * ) Notice: Subject to any disclaimer, the term of this patent is extended or adjusted under 35 U.S.C. 154(b) by 78 days.

(21) Appl. No.: 11/063,748

(22) Filed: Feb. 24, 2005

(65) Prior Publication Data

US 2005/0204219 A1    Sep. 15, 2005

(30) Foreign Application Priority Data

Feb. 27, 2004    (JP)    ............................. 2004-054863

(51) Int. Cl.
*G01R 31/00*    (2006.01)
*G01R 31/02*    (2006.01)

(52) U.S. Cl. ...................... 324/770; 324/158.1; 345/92; 345/98; 349/192

(58) Field of Classification Search .................. 324/770
See application file for complete search history.

(56) References Cited

U.S. PATENT DOCUMENTS

| | | | | |
|---|---|---|---|---|
| 5,546,013 | A * | 8/1996 | Ichioka et al. | ............... 324/770 |
| 6,028,442 | A * | 2/2000 | Lee et al. | .................... 324/770 |
| 6,784,862 | B2 * | 8/2004 | Kodate et al. | .................. 345/92 |
| 6,864,703 | B2 * | 3/2005 | Miyagawa et al. | .......... 324/770 |
| 2002/0063574 | A1 * | 5/2002 | Cheng et al. | ................ 324/770 |

FOREIGN PATENT DOCUMENTS

JP    2000-74974    3/2000

* cited by examiner

*Primary Examiner*—Ha Tran T Nguyen
*Assistant Examiner*—Emily Y Chan
(74) *Attorney, Agent, or Firm*—Smith Patent Office

(57) ABSTRACT

A method and a device for testing an array substrate for a liquid crystal display that allow time for testing to be reduced are provided. An array substrate is divided into two test blocks, and two scanning signal lines in total, one from each of the test blocks, are selected and tested at a time, so that the addresses of possible defective pixels are specified. Then, the array substrate is divided into three test blocks, and three scanning signal lines in total, one from each of the test blocks, are selected and re-tested at a time, so that the addresses of possible defective pixels are specified. Then, the address of a pixel common between the first testing and re-testing is specified as a defective address.

10 Claims, 12 Drawing Sheets

FIG. 1
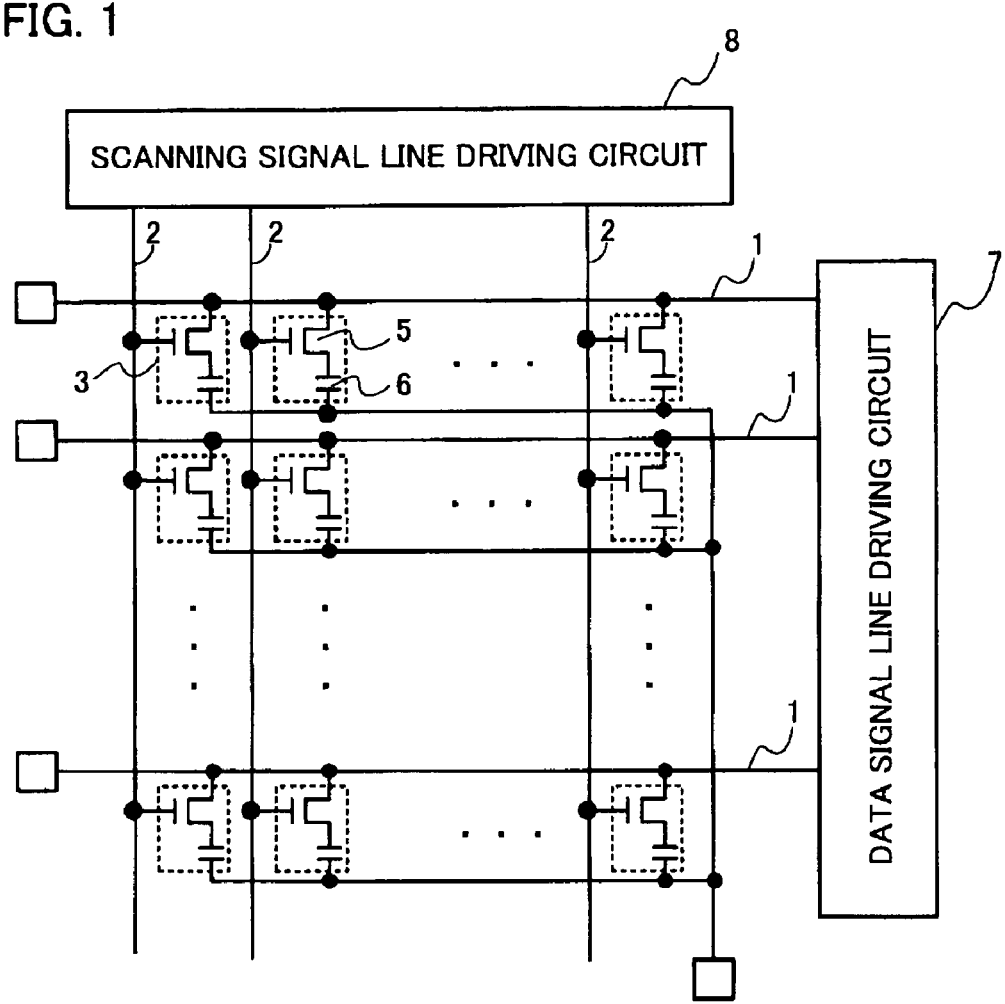
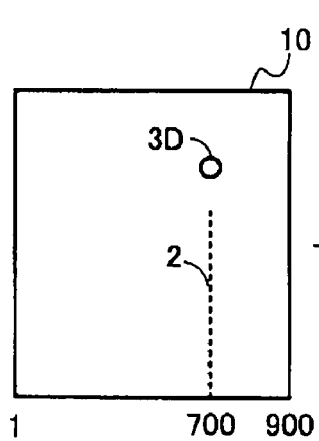
FIG. 2A
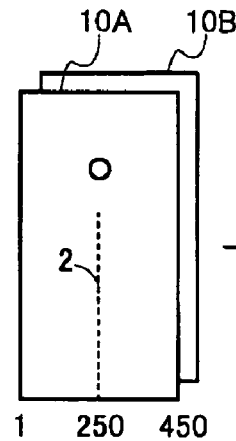
FIG. 2B
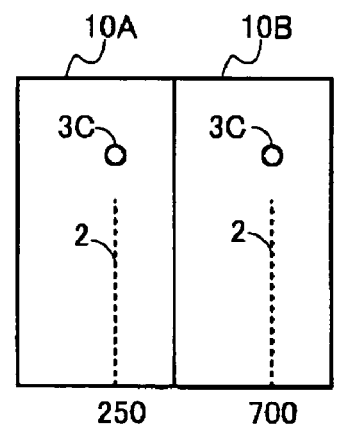
FIG. 2C

METHOD AND DEVICE FOR TESTING ARRAY SUBSTRATE

BACKGROUND OF THE INVENTION

1. Field of the Invention

The invention relates to a method and a device for testing an array substrate, and more particularly, to a method and a device for testing an array substrate for a liquid crystal display.

2. Description of the Related Art

As shown in FIGS. 20 and 21, an array substrate for an active matrix type liquid crystal display includes data signal lines 1, scanning signal lines 2 crossing the data signal lines 1, and pixels 3 provided at crossing points of the data signal lines 1 and the scanning signal lines 2. The pixels 3 each include a thin film transistor (TFT) and a pixel capacitor.

Now, a conventional method for testing such an array substrate will be described.

A data signal is supplied to one data signal line 1 and one scanning signal line 2A is driven. In this way, charge is accumulated at a pixel 3 connected to the scanning signal line 2A (data signal writing).

Now, a detection circuit 4 such as an integrator is connected to each of the data signal lines 1, and one scanning signal line is 2A is driven. In this way, charge accumulated at a pixel 3 connected to the scanning signal line 2A is detected by the detection circuit 4 (data signal reading).

The above-described operation is repeated for all the scanning signal lines 2, and the entire array substrate is tested.

By the testing method, the amount of charge detected from a defective pixel is different from the amount of charge detected from a normal pixel, so that whether a pixel 3 is defective (its defectiveness/non-defectiveness) can be determined.

By the testing method, the scanning signal lines 2 are sequentially driven on a one by one basis, and therefore the address of a defective pixel can be specified, but it takes a long period to test all the pixels 3. In the following description, this conventional method will be referred to as "one pixel sequential measuring method."

Japanese Patent Laid-Open No. 2000-74974 discloses a method of testing an active matrix type liquid crystal display. By the disclosed testing method, two analog switches are simultaneously turned on in order to short-circuit two video buses for supplying a data signal and to detect a line defect. Japanese Patent Laid-Open No. 2000-74974 however does not disclose anything about the simultaneous driving of a plurality of scanning signal lines, which is a characteristic of the present invention.

SUMMARY OF THE INVENTION

It is an object of the invention to provide a method and a device for testing an array substrate that allow time for testing an array substrate to be reduced.

A method for testing an array substrate according to the invention tests an array substrate having a plurality of scanning signal lines, and includes the steps of dividing the array substrate into $N_1$ first test blocks, each block including a plurality of scanning signal lines ($N_1$: an integer of at least two), selecting $N_1$ scanning signal lines in total, by selecting a line from each of the first test blocks, and simultaneously testing the selected $N_1$ scanning signal lines.

By this method, two or more scanning signal lines can be tested at a time, and the testing time can be reduced.

Preferably, the above described method further includes the steps of dividing the array substrate into $N_2$ second test blocks, each block including a plurality of scanning signal lines ($N_2$: an integer of at least two except $N_1$), selecting $N_2$ scanning signal lines in total, by selecting a line from each of the second test blocks, and simultaneously re-testing the selected $N_2$ scanning signal lines.

In this way, an address determined as a possible defective address both by the first testing and re-testing can be specified as a defective address.

Preferably, $N_1$ is two. The above-described method further includes the step of re-testing a scanning signal line in one of the first test blocks.

In this way, two addresses are determined as possible defective addresses, and therefore a defective address can be specified only by re-testing one scanning signal line and leaving the other scanning signal line untested.

More preferably, the re-testing step includes the steps of dividing the array substrate into $N_2$ second test blocks, each block including a plurality of scanning signal lines ($N_2$: an integer of at least two), selecting $N_2$ scanning signal lines in total, by selecting a line from each of the second test blocks, and simultaneously testing the selected $N_2$ scanning signal lines.

In this way, two or more scanning signal lines can be re-tested at a time, and the re-testing time can be reduced.

Preferably, the method further includes the steps of counting defective scanning signal lines based on a result of the testing, re-testing a defective scanning signal line when the count number is less than a predetermined number, dividing the array substrate into $N_2$ second test blocks, each block including a plurality of scanning signal lines when the count number is more than the predetermined number ($N_2$: an integer of at least two except $N_1$), selecting $N_2$ scanning signal lines in total, by selecting a line from each of the second test blocks, and simultaneously re-testing the selected $N_2$ scanning signal lines.

In this way, the number of defects is counted by the first testing and the re-testing method is switched based on the number of defects. If the number of defects is small, the defective scanning signal lines are individually re-tested, and if the number of defects is large, two or more scanning signal lines are re-tested at a time, so that the testing time can be reduced regardless of the number of defects.

A device for testing an array substrate according to the invention tests the array substrate having a plurality of data signal lines, a plurality of scanning signal lines crossing the data signal lines, and a plurality of elements corresponding to crossing points of the data signal lines and the scanning signal lines. The device includes a driver for driving $N_1$ scanning signal lines among the scanning signal lines ($N_1$: an integer of at least two), and a detector for detecting a data signal read out to each of the data signal lines from the corresponding $N_1$ elements by driving the $N_1$ scanning signal lines.

Using this device, two or more scanning signal lines are driven, and data signals are read out from corresponding two or more elements and detected at a time, so that the testing time can be reduced.

Preferably, in the above-described device, the driver drives $N_2$ scanning signal lines among the scanning signal lines ($N_2$: an integer of at least two except $N_1$), and the detector detects a data signal read out to each of the data signal lines from the corresponding $N_2$ elements by driving the $N_2$ scanning signal lines.

In this way, an address determined as a possible defective address both by the first testing and re-testing can be specified as a defective address.

Preferably, $N_1$ is two, the driver re-drives one of the two driven scanning signal lines, and the detector detects a data signal read out to each of the data signal lines from a corresponding single element by driving the one scanning signal line.

In this way, two addresses are determined as possible defective addresses, and therefore a defective address can be specified only by re-testing one signal line and leaving the other signal line untested.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a functional block diagram of the configuration of a matrix type liquid crystal display to be tested by a testing method according to an embodiment of the invention;

FIGS. 2A to 2C are views showing a concept of how first testing is carried out by a two pixel simultaneous measuring method and then re-testing is carried out by a possible defective pixel individual measuring method as one testing method according to the embodiment of the invention;

DESCRIPTION OF THE PREFERRED EMBODIMENTS

Figure 3:
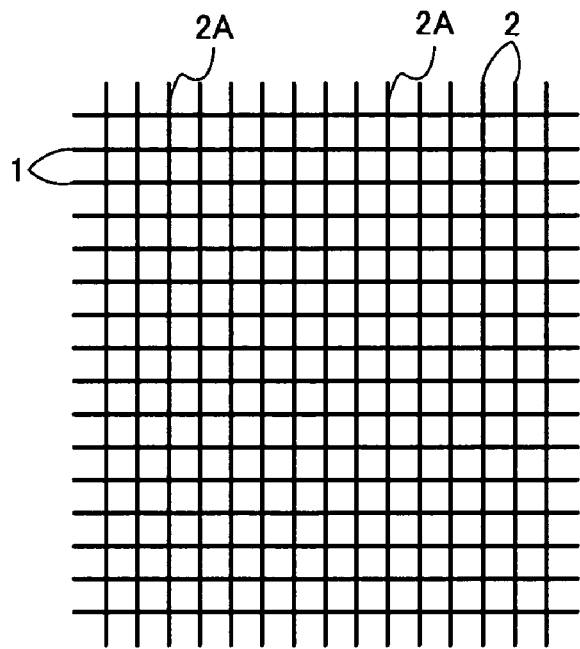
FIG. 3 is a view showing a concept of the two pixel simultaneous measuring method shown in FIG. 2.

Now, with reference to the accompanying drawings, an embodiment of the present invention will be described in detail. In the drawings, the same or corresponding portions are denoted by the same reference characters and the description about them will not be repeated.

Before describing the testing method according to the embodiment of the invention, the structure of an array substrate to be tested will be briefly described. Herein, an array substrate in an active matrix type liquid crystal display will be described by way of illustration.

As shown in FIG. 1, the array substrate includes data signal lines 1, scanning signal lines 2 crossing the data signal lines 1, and pixels 3 provided at crossing points of the data signal lines 1 and the scanning signal lines 2. The pixels 3 each include a TFT 5 and a pixel capacitor 6. Each of the TFTs 5 has its one source/drain connected to a data signal line 1 and its other source/drain connected to one electrode of a pixel capacitor 6, and the gate is connected to a scanning signal line 2. All the electrodes of the pixel capacitors 6 on the other side are connected together. The data signal lines 1 are connected to a data signal line driving circuit 7. The scanning signal lines 2 are connected to a scanning signal line driving circuit 8. The data signal line driving circuit 7 supplies a data signal to the data signal lines 1. The scanning signal line driving circuit 8 selectively drives the scanning signal lines 2.

Testing Method

By the testing method according to the embodiment, a "two pixel simultaneous measuring method" as the first testing precedes a "defective address specifying method" as re-testing.

1. Two Pixel Simultaneous Measuring Method (First Testing)

(1) As shown in FIG. 2A, an array substrate 10 to be tested is prepared. In this example, it is assumed that the array substrate has 900 scanning signal lines and one defective pixel 3D on the 700th scanning signal line.

(2) As shown in FIG. 2B, the array substrate 10 is virtually divided into halves. More specifically, the array substrate 10 is divided into two test blocks 10A and 10B. The test blocks 10A and 10B each include 450 scanning signal lines.

(3) As shown in FIG. 3, two scanning signal lines in total, one from each of the test blocks 10A and 10B, are selected.

(4) The selected two scanning signal lines 2A are tested at a time. More specifically, one scanning signal line 2A is driven in the first half test block 10A while the other scanning signal line 2A is driven in the second half test block 10B at the same time. The two scanning signal lines 2A to be driven are not particularly limited, but they are in the same corresponding positions in the two test blocks 10A and 10B.

Each of the scanning signal lines 2 is tested by writing a data signal to a corresponding pixel 3 and reading out the data signal from the pixel 3.

In order to write the data signal to the pixel 3, the data signal is supplied to the data signal line 1 by the data signal line driving circuit 7, and the two scanning signal lines 2A are simultaneously driven by the scanning signal line driving circuit 8. In this way, the TFTs 5 in the two lines connected to the two scanning signal lines 2A are turned on and charge is accumulated in the pixel capacitors 6 in the corresponding two lines.

Figure 4:
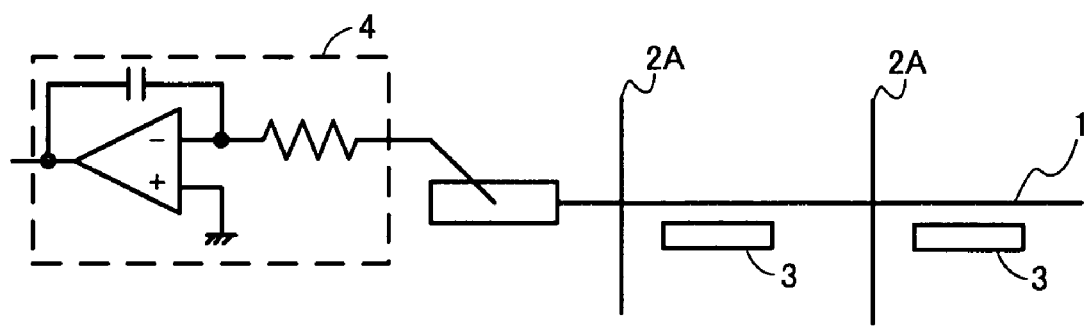
FIG. 4 is a circuit diagram of a testing device used by the two pixel simultaneous measuring method shown in FIG. 3.

Now, as shown in FIG. 4, in order to read out the data signal from the pixel 3, a detection circuit 4 is connected to each of the data signal lines 1, and the two scanning signal lines 2A are simultaneously driven by the scanning signal line driving circuit 8. In this way, the TFTs 5 in the two lines connected to the two scanning signal lines 2A are turned on, and charge accumulated in the pixel capacitors 6 in the corresponding two lines are detected by the detection circuit 4.

If the two pixels 3 selected at the same time are both normal, the amount twice the normal amount of charge detected from a single pixel 3 (hereinafter as "reference charge amount") is detected. If for example one of the pixels 3 is defective, the amount of charge different from the reference charge amount is detected.

(5) The operation in (3) and (4) is repeated for all the scanning signal lines 2. More specifically, the 1st and the 451st scanning signal lines 2 are simultaneously driven, and then the scanning signal lines are sequentially driven two at a time to the 450th and 900th scanning signal lines 2.

As shown in FIG. 2C, in this example, the 250(=700−450)-th scanning signal line 2 and the 700(=450+250)-th scanning signal line 2 are driven at a time, and a charge amount different from the reference charge amount is detected. Therefore, the two pixels 3C on these two scanning signal lines 2 are determined as possible defective pixels.

By the above-described two pixel simultaneous measuring method, the amounts of charge accumulated at the two pixels 3 are measured at a time, and therefore the time required for testing can be shortened. If there is no defective pixel after all, the testing time will be half that by the conventional method. If it is determined by the first testing that there is no defective pixel, the following re-testing is not necessary.

In this example, the two pixel simultaneous measuring method is employed as the first testing, while a "three pixel simultaneous measuring method" may be employed and the array substrate may be divided into three test blocks, so that the amounts of charge accumulated in three pixels may be measured at a time. In general, the method of simultaneously measuring the amounts of charge accumulated at a plurality of pixels in a plurality of test blocks divided from an array substrate will hereinafter be referred to as "multiple pixel simultaneous measuring method."

The above-described two pixel simultaneous measuring method can determine the presence of one defective pixel in the two simultaneously selected pixels 3 but not which one of them is defective. In order to determine which one of the pixels is defective, the following defective address specifying method is carried out.

2. Defective Address Specifying Method (Re-Testing)

As a method of specifying the address of a defective pixel, there are a "possible defective pixel individual measuring method," a "three pixel simultaneous measuring method," a "one side two pixel simultaneous measuring method," and "switching between the possible defective pixel individual measuring method and the multiple pixel simultaneous measuring method." Now, these methods will be described.

2.1. Possible Defective Pixel Individual Measuring Method

All the possible defective pixels determined by the two pixel simultaneous measuring method are re-tested one by one. As shown in FIG. 2C, the 250th scanning signal line 2A is driven and charge at the possible defective pixel 3C on the line is measured. Then, the 700th scanning signal line 2A is driven and charge accumulated at the possible defective pixel 3C on the line is measured. Since the pixel 3C on the 250th scanning signal line 2A is normal, the normal charge amount is detected from it, but the pixel 3C on the 700th scanning signal line 2A is defective and therefore an amount different from the normal charge amount is detected from it. In this way, the pixel 3C can be determined as a defective pixel and its address can be specified.

In the possible defective pixel individual measuring method, however, the re-measuring process to specify a defective address takes long. Therefore, when there are a lot of defective pixels, the time for testing can be longer than that by the conventional one pixel sequential measuring method. The testing time by the combination of the multiple pixel simultaneous measuring method and the possible defective pixel individual measuring method is represented by the following Expression (1):

$$\text{Testing time} = \frac{Tscan}{N} + Tmode + Taddr \cdot N \cdot D + Tana \cdot D \quad (1)$$

wherein Tscan represents time required for measuring all the pixels by the one pixel sequential measuring method (including time for detecting defective pixels), N the number of pixels measured at a time, Tmode time required for switching between the measuring methods (modes), Taddr time required for specifying a defective address per pixel (while Taddr=0 by the one pixel sequential measuring method), D the number of defective pixels, and Tana time required for defect analysis per pixel.

Figure 5:
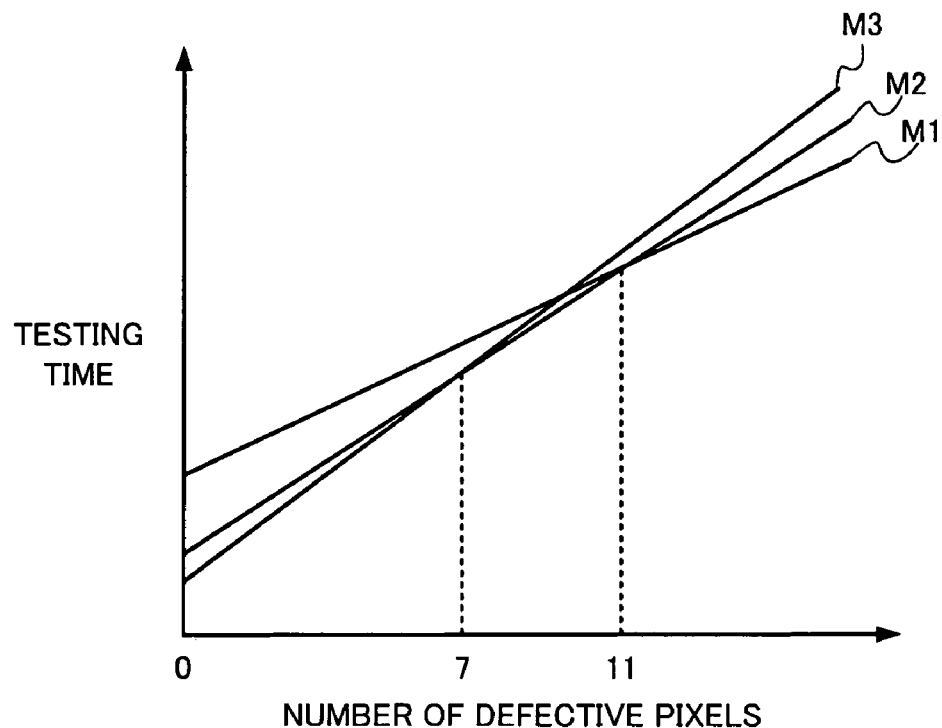
FIG. 5 is a graph showing the dependence of the testing time on the number of defective pixels by a conventional one pixel sequential measuring method, the two pixel simultaneous measuring method, and a three pixel simultaneous measuring method.

When for example an XGA (eXtended Graphics Array) including 1024×768 pixels is tested in the condition where Tscan=4.67 sec, Tmode=0.10 sec, Taddr=0.11 sec, and Tana=1.20 sec, the graph shown in FIG. 5 is given. The ordinate represents the testing time, and the abscissa represents the number of defective pixels. The graph shows the dependence of the testing time on the number of defective pixels by the conventional one pixel sequential measuring method M1, the two pixel simultaneous measuring method M2 as the first testing, and the three pixel simultaneous measuring method M3 as the first testing.

As can clearly be understood from the graph, when the number of defective pixels is small, the testing time is shorter by the two or three pixel simultaneous measuring method M2, M3 than the one pixel sequential measuring method M1, but when the number of defective pixels is large, the testing time is longer by the two or three pixel simultaneous measuring method M2, M3 than the one pixel sequential measuring method M1. In this example, the testing time is longer by the three pixel simultaneous measuring method M3 than the two pixel sequential measuring method M2 when there are seven or more defective pixels. The testing time is longer by the two pixel simultaneous measuring method M2 than the one pixel sequential measuring method M1 when there are eleven or more defective pixels.

In this way, by the possible defective pixel individual measuring method as the defective address specifying method, the testing time is, if anything, longer when there are a lot of defective pixels. Therefore, the following three pixel simultaneous measuring method is preferably employed as the defective address specifying method.

2.2. Three Pixel Simultaneous Measuring Method

Figure 6A:
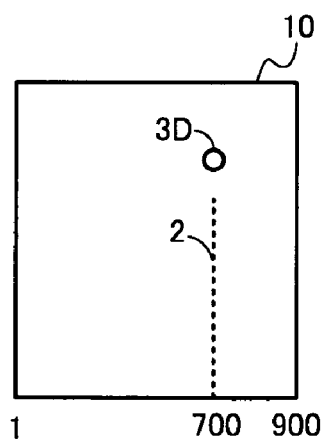
FIGS. 6A to 6C are views showing a concept of how first testing is carried out by the two pixel simultaneous measuring method and then re-testing is carried out by the three pixel simultaneous measuring method as a defective address specifying method according to another testing method according to the embodiment of the invention.
Figure 6B:
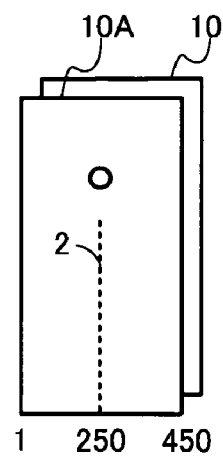
Figure 6C:
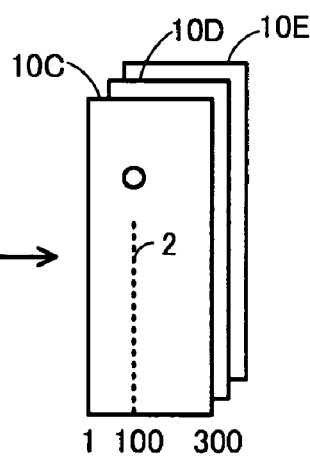

As shown in FIGS. 6A and 6B, when the two pixel simultaneous measuring method is carried out as the first testing as described above, and a defective pixel is found, the number of test blocks is changed as shown in FIG. 6C, and the entire array substrate 10 is tested again, details of which are as follows.

(1) The array substrate 10 is divided into three test blocks 10C, 10D, and 10E. The test blocks 10C, 10D, and 10E each include 300 scanning signal lines 2.

(2) Three scanning signal lines 2 in total, one from each of the test blocks 10C, 10D, and 10E, are selected.

(3) The three selected scanning signal lines 2 are tested at a time. More specifically, one scanning signal line 2 is driven in the first one-third part, test block 10C, another scanning signal line 2 is driven in the second one-third part, test block 10D, and the other scanning signal line 2 is driven in the last one-third part, test block 10E. Otherwise, the process is basically the same as the two pixel simultaneous measuring method as the first testing. More specifically, the amounts of charge accumulated at the three pixels 3 are simultaneously detected.

(4) The operation in (2) and (3) is repeated for all the scanning signal lines 2. More specifically, the 1st, 301st and 601st scanning signal lines 2 are driven at a time to begin with, and then the scanning signal lines 2 are driven on a three at a time basis until the 300th, 600th, and 900th lines are driven.

Figure 7A:
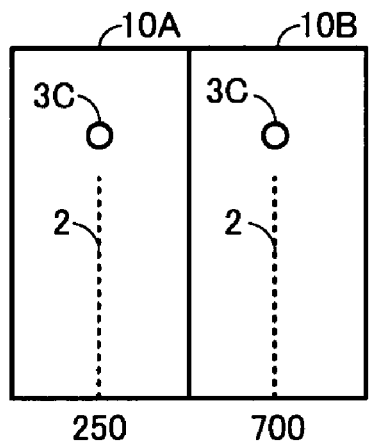
FIG. 7A shows possible defective pixels based on the result of the two pixel simultaneous measuring method.
Figure 7B:
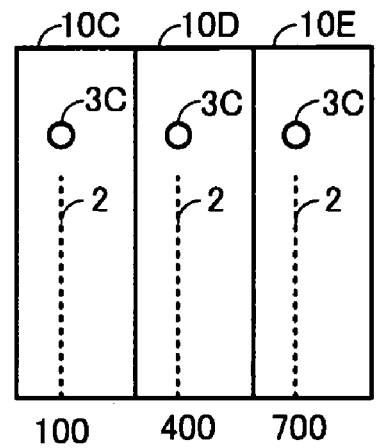
FIG. 7B shows possible defective pixels based on the result of the three pixel simultaneous measuring method.

In this example, after the two pixel simultaneous measuring method shown in FIG. 6B is carried out, two pixels 3C at the 250th and 700th scanning signal lines 2 are selected as possible defective pixels as shown in FIG. 7A. When the three pixel simultaneous measuring method shown in FIG. 6C is carried out, three pixels 3C on the 100(=700−300−300)-th, 400(=100+300)-th, and 700(=100+300+300)-th scanning signal lines 2 are selected as possible defective pixels shown in FIG. 7B.

(5) Assume that the pixel 3C on the 700th scanning signal line 2A is detected as a defective pixel both by the two pixel simultaneous measuring method and the three pixel simultaneous measuring method. In this way, the address of the defective pixel 3D can be specified. If the pixels detected by the two pixel simultaneous measuring method are both defective, these pixels are not tested at a time by the three pixel simultaneous measuring method, and therefore the pixels can be determined as defective pixels.

In this example, the two pixel simultaneous measuring method is employed for the first testing and the three pixel simultaneous measuring method is employed for the re-testing (hereinafter referred to as "two to three pixel simultaneous measuring test"), but the process is not limited to the methods. For example, "two to five pixel simultaneous measuring test," "three to four pixel simultaneous measuring test," "three to two pixel simultaneous measuring test," "four to five pixel simultaneous measuring test," or "four to six pixel simultaneous measuring test" can be employed. However, the process such as "two to four pixel simultaneous measuring test" cannot be carried out. This is because addresses to be tested at a time fully overlap. In short, any combinations can be employed unless the number of pixels to be tested by one test is a divisor or multiple of the number of pixels to be tested at the same time by the other test.

In general, the testing time by $N_1$ to $N_2$ pixel simultaneous measuring test is represented by the following Expression (2):

$$\text{Testing time} = \frac{Tscan}{N_1} + Tmode + \frac{Tscan}{N_2} \cdot F + Tmode + Tana \cdot D \quad (2)$$

wherein $N_1$ represents the number of pixels measured at a time by the first testing, $N_2$ the number of pixels measured at a time by the re-testing, and F the presence/absence of a defective pixel. With no defective pixel, F=1, and otherwise F=0. The other symbols are the same as those in Expression (1).

Figure 8:
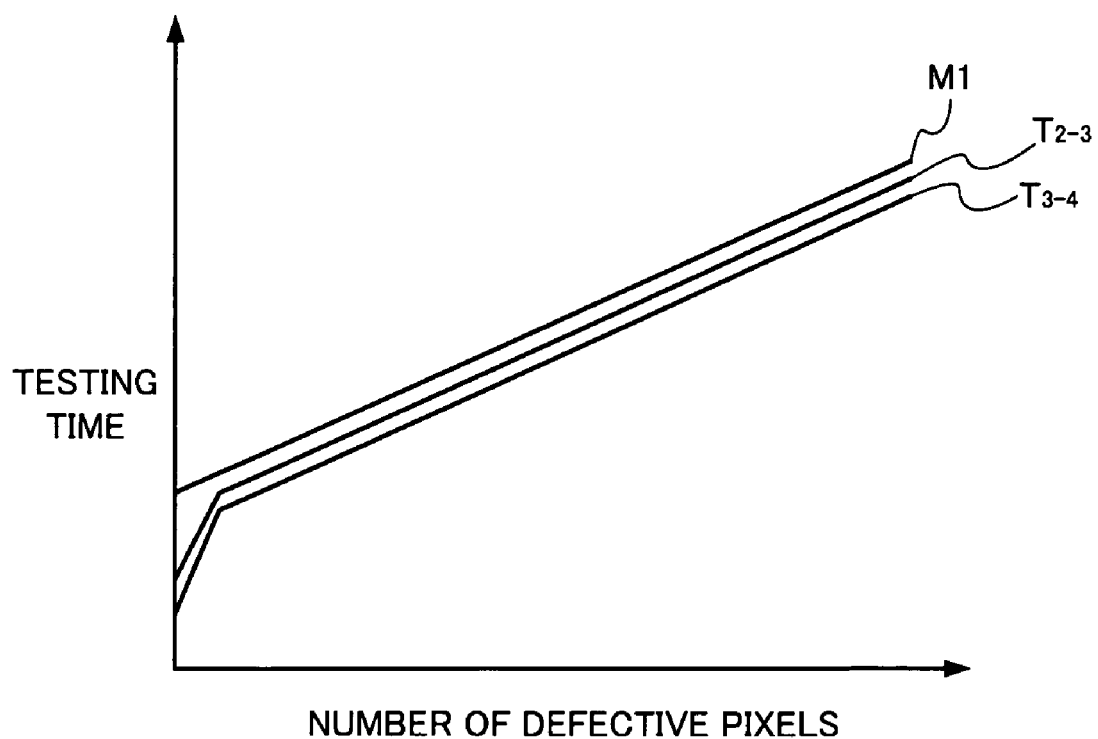
FIG. 8 is a graph showing the dependence of the testing time on the number of defective pixels by the conventional one pixel sequential measuring method, the two pixel simultaneous measuring method as first testing followed by the three pixel simultaneous measuring method as re-testing, and the three pixel simultaneous measuring method as first testing followed by a four pixel simultaneous measuring method as re-testing.

When for example an XGA is tested in the condition where Tscan=4.67 sec, Tmode=0.10 sec, and Tana=1.20 sec, the graph shown in FIG. 8 is given. The graph shows the dependence of the testing time on the number of defective pixels by the conventional one pixel sequential measuring method M1, the two to three pixel simultaneous measuring test $T_{2-3}$, and the three to four pixel simultaneous measuring test $T_{3-4}$.

As can clearly be understood from the graph, the duration of the testing time is not reversed unlike the case shown in FIG. 5. When it is determined by the first testing that no defective pixel exists, re-testing will not be carried out. Therefore, the testing time in the case is equal to the time required for the first testing and therefore extremely shorter than the case even with one defective pixel.

2.3. One Side Two Pixel Simultaneous Measuring Method

Figure 9A:
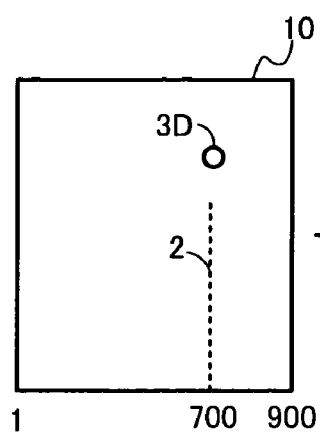
FIGS. 9A to 9C are views showing a concept of how re-testing is carried out by a one-side two pixel simultaneous measuring method as another defective address specifying method according to the embodiment of the invention.
Figure 9B:
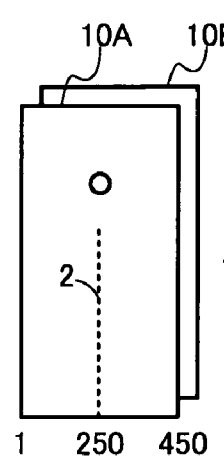
Figure 9C:
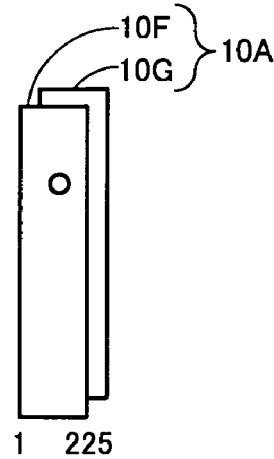

As shown in FIGS. 9A and 9B, when the two pixel simultaneous measuring method is carried out as the first testing, and a defective pixel is found, the two pixel simultaneous measuring method may be carried out again only for the first or last half of the array substrate 10 as re-testing as shown in FIG. 9C. If a defective pixel is present in the first or last half, the address of the pixel needs only be specified. If no defective pixel is present, the address of the other pixel needs only be specified. Details of the process are as follows.

(1) The first half of the array substrate 10 is further halved. More specifically, the first half test block 10A is divided into two test blocks 10F and 10G. The test blocks 10F and 10G each include 225 scanning signal lines.

(2) Two scanning signal lines 2 in total, one from each of the test blocks 10F and 10G, are selected.

(3) The selected two scanning signal lines 2 are tested at a time. More specifically, one scanning signal line 2 is driven in the test block 10F while the other scanning signal line 2 is driven the test block 10G at the same time.

(4) The operation in (2) and (3) is repeated for all the scanning signal lines 2 in the first half test block 10A. More specifically, the 1st, and 226th scanning signal lines 2 are driven at a time to begin with, and then the scanning signal lines 2 are driven on a two at a time basis until the 225th and 450th lines are driven.

In this example, after the two pixel simultaneous measuring method shown in FIG. 9B is carried out, two pixels 3C on the 250th and 700th scanning signal lines 2 are selected as possible defective pixels as shown in FIG. 7A. When the two pixel simultaneous measuring method shown in FIG. 9C is carried out again, it is determined that there is no defective pixel in the first half. Consequently, it is determined that the pixel 3C on the 700th scanning signal line 2 in the last half is determined as a defective pixel. Therefore, the address of the defective pixel 3D can be specified.

By this one side two pixel simultaneous measuring method, the two pixel simultaneous measuring method is employed both for the first testing and re-testing, and therefore stable results may be provided.

Figure 10:
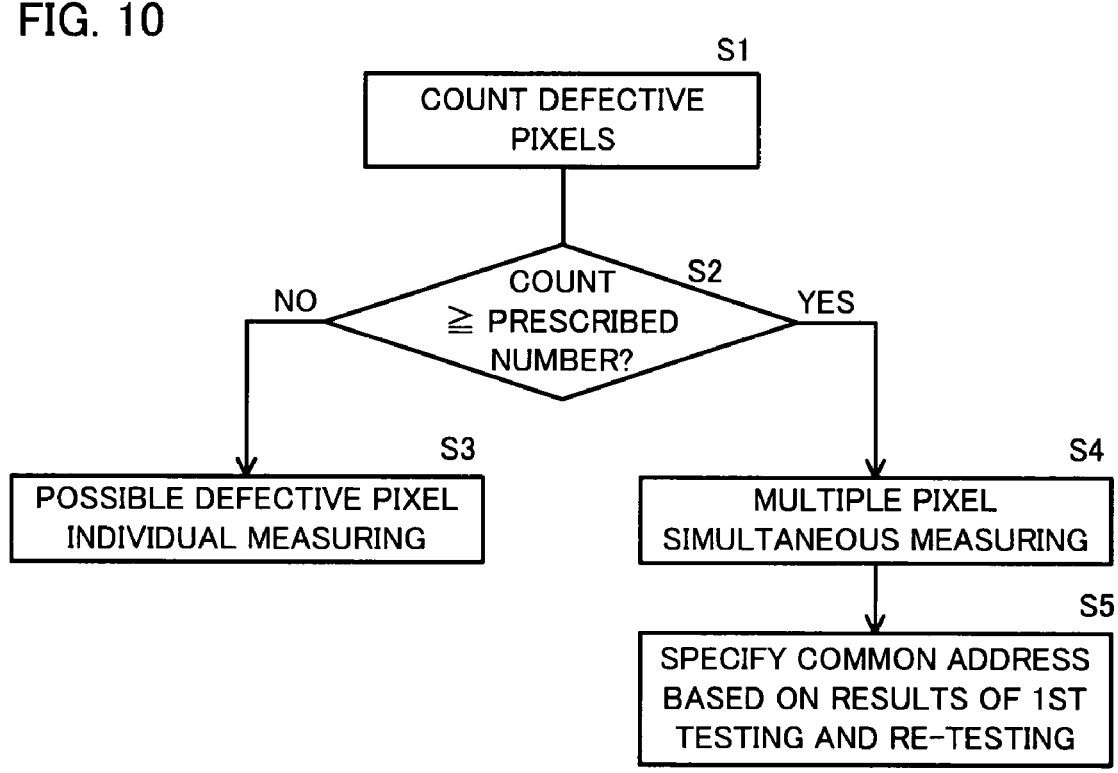
FIG. 10 is a flowchart for use in illustration of a method of switching between the possible defective pixel individual measuring method and a multiple pixel simultaneous measuring method as another defective address specifying method according to the embodiment of the invention.

2.4. Method of Switching between Possible Defective Pixel Individual Measuring Method and Multiple Pixel Simultaneous Measuring Method The number of defective pixels is typically from 0 to 5 in an actual array substrate 10. If the number of defective pixels is small, the testing time is shorter by the possible defective pixel individual measuring method as the defective address specifying method than by the multiple pixel simultaneous measuring method. Therefore, if the number of defective pixels is small, the defective address specifying method may be switched to the possible defective pixel individual measuring method, and if the number of defective pixels is large, the multiple pixel simultaneous measuring method may be employed. For example, the switching process can be implemented by software as shown in FIG. 10.

(1) Defective pixels are counted based on the result of the first testing carried out by the multiple pixel simultaneous measuring method (S1).

(2) It is determined whether the number of defective pixels is equal to or larger than a predetermined number (S2).

(3) If the count of the defective pixels is less than the predetermined number, the possible defective pixel individual measuring method is carried out in order to individually specify the addresses of the defective pixels (S3).

(4) If the count of the defective pixels is not less than the predetermined number, the number of pixels to be measured at a time is changed and the multiple pixel simultaneous measuring method is carried out again (S4).

(5) An address common between the result of the first testing carried out by the multiple pixel simultaneous measuring method and the result of the re-testing carried out by the multiple pixel simultaneous measuring method is specified as the address of a defective pixel (S5).

Figure 11:
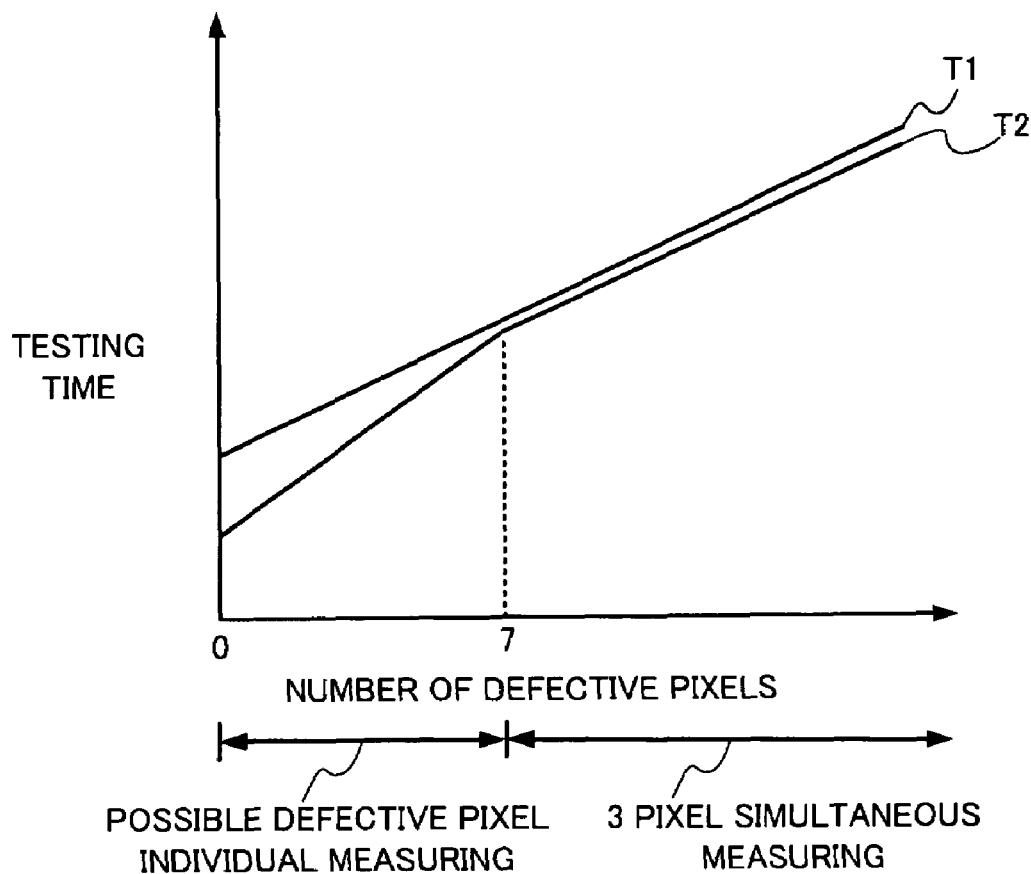
FIG. 11 is a graph showing the dependence of the testing time on the number of defective pixels by the conventional one pixel sequential measuring method and the switching method shown in FIG. 10.

The graph in FIG. 11 shows the dependence of the testing time on the number of defective pixels by the conventional one pixel sequential measuring method ($T_1$), and by the two pixel simultaneous measuring method for the first testing followed by the method of switching the possible defective pixel individual measuring method and the three pixel simultaneous measuring method for re-testing as the defective address specifying method ($T_2$).

The number of defective addresses suitable for allowing the defective address specifying method to be switched to the possible defective pixel individual measuring method and the multiple pixel simultaneous measuring method is produced from the relational expression about the number of defective pixels and testing time. When the number of defective pixels is not less than seven, the defective address specifying method is switched to the three pixel simultaneous measuring method.

Testing Device

Now, following the above description of the testing method, an example of a testing device for carrying out the testing method will be described.

Figure 12:
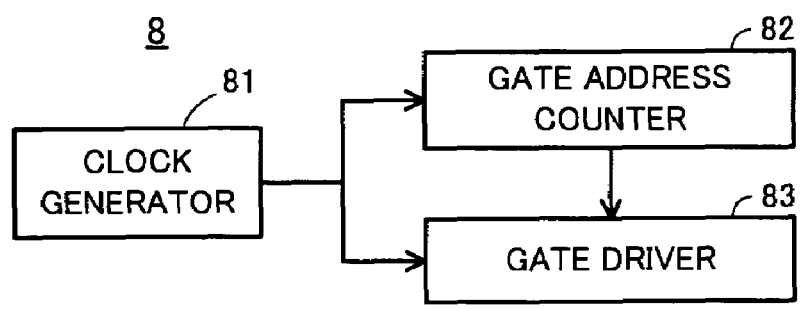
FIG. 12 is a functional block diagram of the configuration of a scanning signal line driving circuit shown in FIG. 1.

A well-known testing device generally referred to as an array tester includes a scanning signal line driving circuit 8 as shown in FIG. 1. As shown in FIG. 12, the scanning signal line driving circuit 8 typically includes a clock generator 81, a gate address counter 82, and a gate driver 83. The clock generator 81 generates a clock signal CK and applies the signal to the gate address counter 82 and the gate driver 83. The gate address counter 82 generates a gate address to specify a scanning signal line to be driven. The gate driver 83 includes a shift register (not shown) and a plurality of transistors (not shown), a start signal input in response to a gate address is shifted by the shift register, and the scanning signal line is driven by the transistors.

Figure 13:
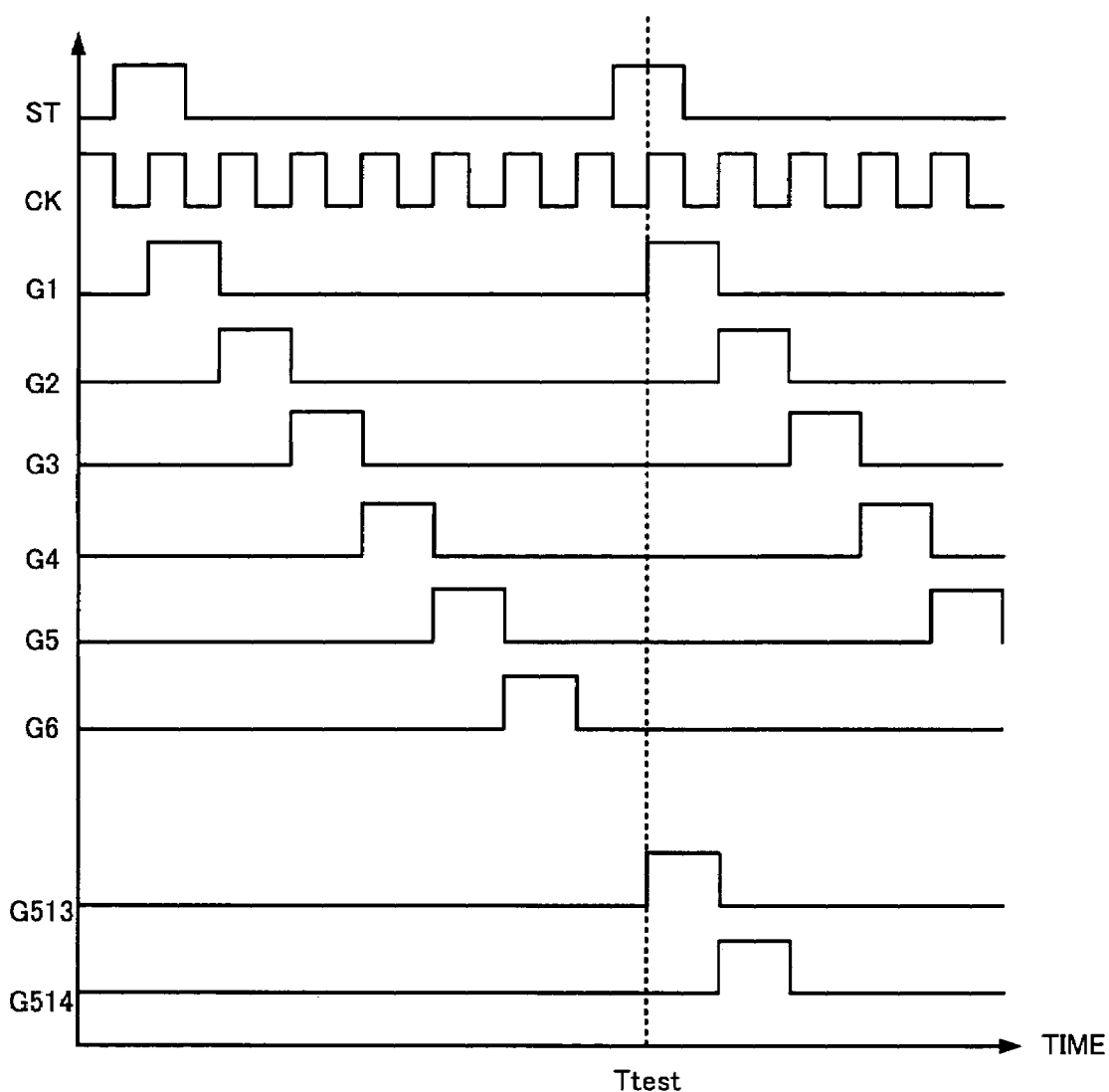
FIG. 13 is a timing chart showing the operation of a gate driver shown in FIG. 12 by the two pixel simultaneous measuring method shown in FIG. 3.

For example, an SXGA (Super extended Graphics Array) including 1280×1024 pixels has 1024 scanning signal lines, and therefore a start signal ST is input in a timing as shown in FIG. 13 so that the 1st and 513th scanning signal lines are driven at a time. The start signal ST is input to the shift register in the gate driver 83 in response to the gate address and shifted in response to the clock signal CK in the shift register. Consequently, scanning signals G1 to G1024 (not shown after G515) are applied to the scanning signal lines from the gate driver 83. In this example, two scanning signal lines are driven at a time after time Ttest.

Figure 14:
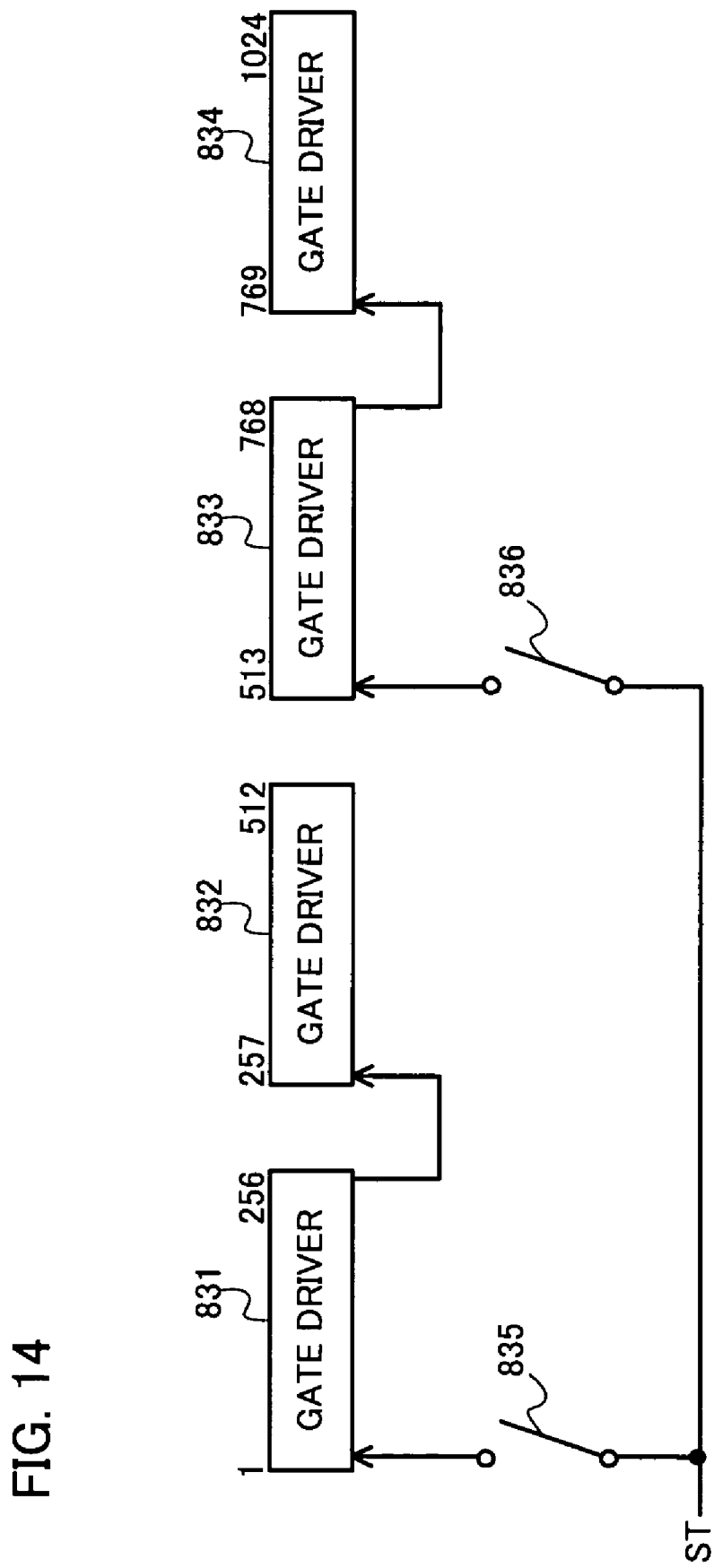
FIG. 14 is a functional block diagram of another configuration of a gate driver for implementing the two pixel simultaneous measuring method shown in FIG. 3.

As shown in FIG. 14, four switchable gate drivers 831 to 834 may be used. The gate drivers 831 to 834 each include a 256 bit shift register (not shown). When the two pixel simultaneous measuring method is carried out, two switches 835 and 836 are both turned on, and the start signal ST may be input to the first bit of each of the gate drivers 831 and 833. The start signal ST input to the gate driver 831 is shifted in the gate drivers 831 and 832. Consequently, the scanning signal lines in the first half of the array substrate are sequentially driven. At the same time, the start signal ST input to the gate driver 833 is shifted in the gate driver 833 and 834 and consequently, the scanning signal lines in the second half of the array substrate are sequentially driven. When only the first half of the array substrate is selected, the switch 835 may be turned on and the switch 836 may be turned off. When only the second half of the array substrate is selected, the switch 835 may be turned off and the switch 836 may be turned on.

The gate drivers do not have to be provided as described above, and any kind of hardware may be used as long as one or two desired scanning signal lines can be driven.

The four defective address specifying methods have been described by way of illustration, but other methods may be employed.

Figure 15:
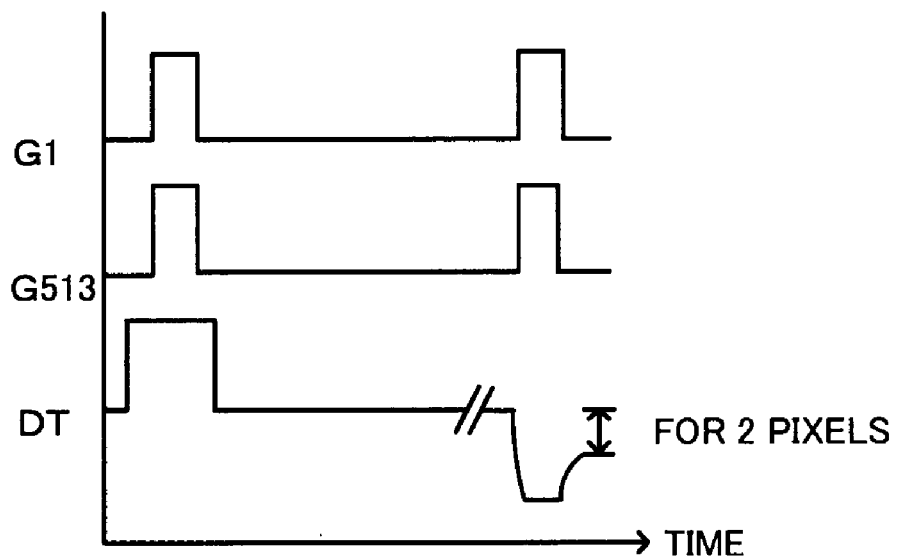
FIG. 15 is a timing chart showing a scanning signal and a data signal by the two pixel simultaneous measuring method shown in FIG. 3.

As shown in FIG. 15, by the two pixel simultaneous measuring method described above, the scanning signals G1 and G513 are activated at a time while a data signal DT is applied in order to write the data signal DT to the two pixels. Then, the scanning signals G1 and G513 are activated at a time in order to read the data signal DT from the two pixels. The read out data signal DT is integrated and the amount of charge for the two pixels is measured.

Figure 16:
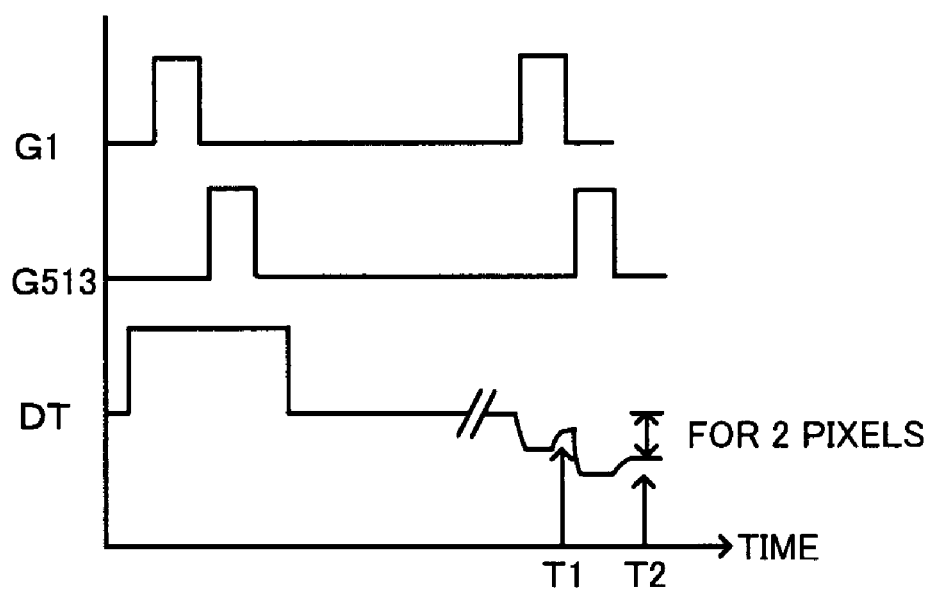
FIG. 16 is a timing chart showing a scanning signal and a data signal when the two pixel simultaneous measuring method shown in FIG. 3 is carried out as yet another defective address specifying method according to the embodiment of the invention.

Meanwhile, by another defective address specifying method, when the two pixel simultaneous measuring method is carried out as the first testing, a data signal DT is written to two pixels, and scanning signals G1 and G513 are sequentially activated one by one as shown in FIG. 16 while the data signal DT is applied. Then, in order to read out the data signal DT from the two pixels, scanning signals G1 and G513 are sequentially activated one by one. In this way, the data signal DT is read out from the first one pixel, and then the data signal DT is read out from the second pixel. These data signals DT are continuously integrated. Therefore, when an integral value is obtained at time T1, the amount of charge for one pixel can be measured. When the integral value is obtained at time T2, the amount of charge for two pixels can be measured.

In the first testing, as described above, whether the two pixels are defective is determined based on the amount of charge measured for the two pixels. In the re-testing, only the two pixels determined as defective are tested, and whether or not one of the pixel is defective is determined based on the amount of charge measured for one pixel. In this way, by determining which among the two pixels is defective, the address of the defective pixel can be specified. Therefore, the array substrate does not have to be scanned again as with the four address specifying methods described above.

Figure 17:
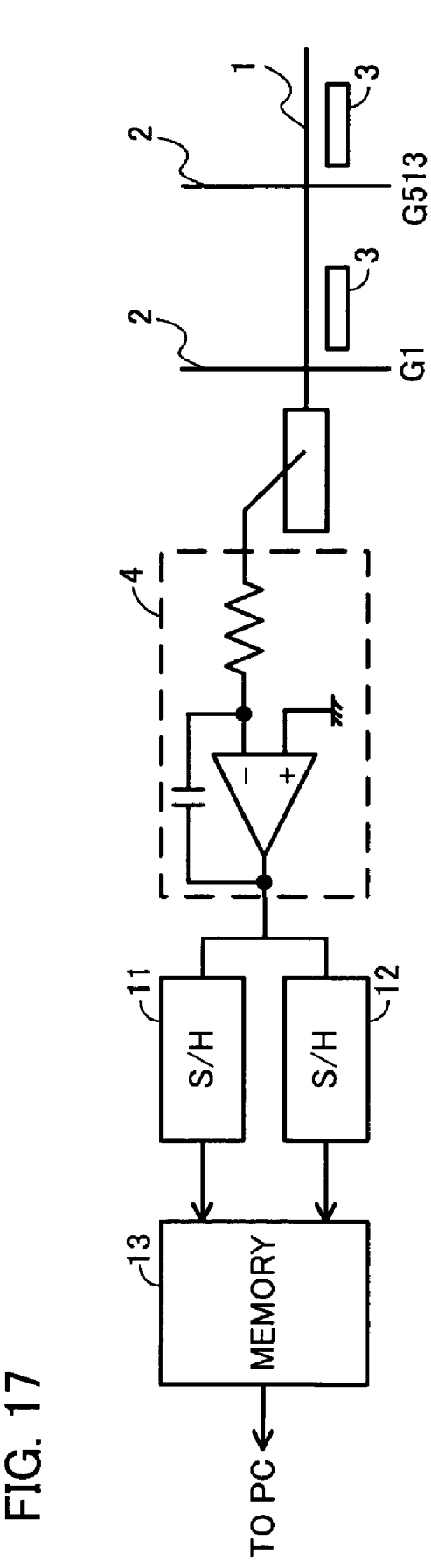
FIG. 17 is a functional block diagram of the configuration of a testing device for implementing the two pixel simultaneous measuring method shown in FIG. 16.

As shown in FIG. 17, the testing device for implementing the defective address specifying method includes two sample-hold (S&H) circuits 11 and 12 connected to the data signal line 1. The sample-hold circuit 11 samples and holds the amount of charge for one pixel at time T1 when the scanning signal G1 is inactivated. The sample-hold circuit 12 samples and holds the amount of charge for two pixels at time T2 when the scanning signal G513 is inactivated. The charge amount data for the one pixel and the charge amount data for the two pixels are both accumulated in a memory 13. In the two pixel simultaneous measuring method as the first testing, only the charge amount data for the two pixels is transferred to the PC and whether the pixels are defective or not is determined based on the data. Only when the address of the defective pixel in the two pixels is specified, the charge amount data for the remaining one pixel is transferred to the PC.

The conventional array tester keeps a fixed time period as a writing and reading cycle, and therefore the time required for testing is not prolonged if two scanning signal lines 2 are activated one by one within the time period. Only the charge amount for the two measured pixels is transferred to the PC, so that the defectiveness/non-defectiveness is determined, and therefore the time for measuring the charge amount is not longer than the above-described case.

Figure 18:
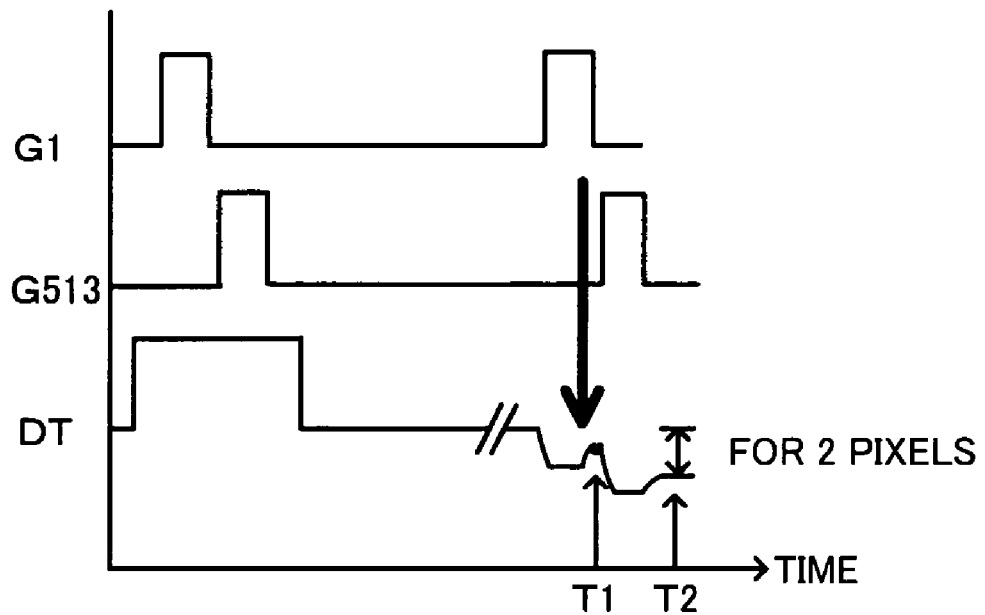
FIG. 18 is a timing chart for use in illustration of a problem associated with the two pixel simultaneous measuring method shown in FIG. 16.
Figure 19:
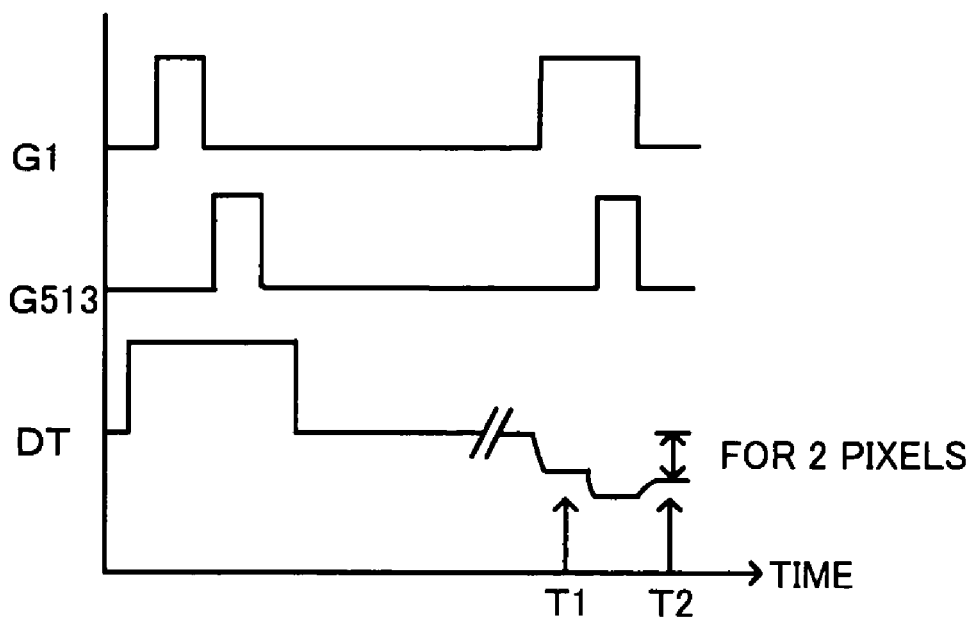
FIG. 19 is a timing chart showing a scanning signal and a data signal by the two pixel simultaneous measuring method after solving the problem shown in FIG. 18.
Figure 20:
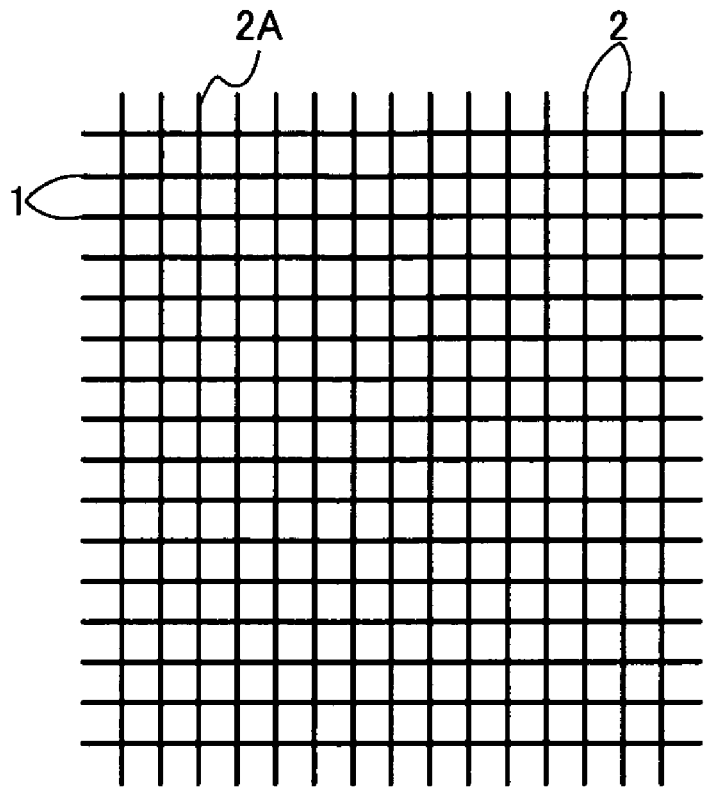
FIG. 20 is a view showing a concept of how the one pixel sequential measuring method as the conventional method of testing an array substrate is carried out.
Figure 21:
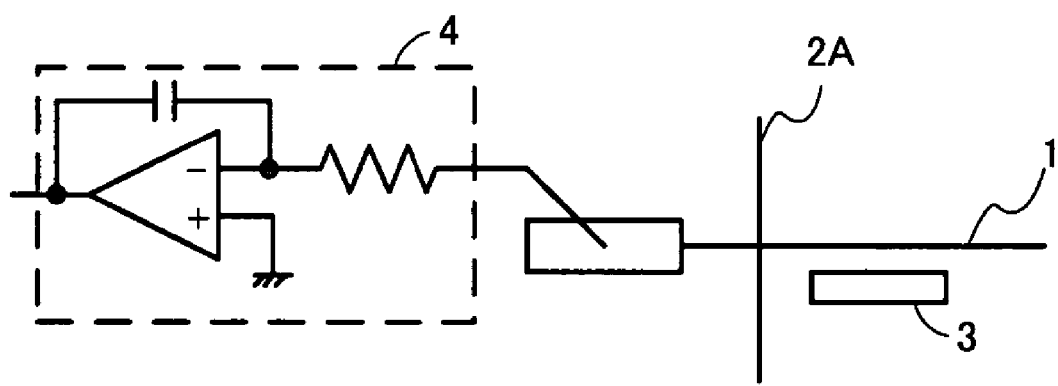
FIG. 21 is a circuit diagram of a testing device used by the one pixel sequential measuring method shown in FIG. 20.

Ideally, a scanning signal line is driven in a timing shown in FIG. 16, but in practice, the capacitive coupling between the scanning signal line and the data signal line may cause noise to be included in the data signal DT at inactive time T1 for the scanning signal G1 as shown in FIG. 18. The noise destabilizes the measurement for the charge amount. Therefore, in order to cancel the noise, the scanning signal G513 should be activated and then the scanning signal G1 should continue to be activated as shown in FIG. 19. In this case, the charge amount for one pixel sampled and held at time T1 includes the coupling capacitance between the scanning signal line and the data signal line. However, by the two pixel simultaneous measuring method as the first testing, the measured charge amount is compared to the charge amount measured based on several surrounding pixels and therefore the determination precision regarding the defectiveness/non-defectiveness can be secured.

By this testing method, two scanning signal lines are not driven at a time, but the charge amount for two pixels are measured at a time, and therefore in effect two scanning signal lines are tested.

In the foregoing, an array substrate using a three-terminal element such as a TFT is shown as a switching element for a pixel by way of illustration, but the invention is applicable to an array substrate with a two-terminal element such as a diode. The invention is applicable not only to an active matrix type but also to a simple matrix type liquid crystal display. The invention is further applicable to any array substrate having a plurality of signal lines other than the liquid crystal display.

Although the embodiment of the invention has been described and illustrated in detail, it is clearly understood that the same is by way of illustration and example only and is not to be taken by way of limitation. The embodiment can be modified as required without departing from the scope of the invention.

INDUSTRIAL APPLICABILITY

The present invention can be applied for testing an array substrate having a plurality of signal lines, and is particularly applicable to an array substrate for an active matrix type liquid crystal display.

What is claimed is:

1. A method of testing an array substrate having a plurality of scanning signal lines, comprising the steps of:
    dividing said array substrate into $N_1$ first test blocks, each block including a plurality of scanning signal lines, $N_1$ being an integer of at least two;
    simultaneously selecting $N_1$ scanning signal lines in total, by selecting only one scanning signal line from each of said $N_1$ first test blocks; and
    simultaneously testing the selected $N_1$ scanning signal lines.

2. The method according to claim 1, further comprising the steps of:
    dividing said array substrate into $N_2$ second test blocks, each block including a plurality of scanning signal lines, $N_2$ being not equal to $N_1$ and an integer of at least two;
    selecting $N_2$ scanning signal lines in total, by selecting a line from each of said second test blocks; and
    simultaneously re-testing the selected $N_2$ scanning signal lines.

3. The method according to claim 1, wherein $N_1$ is two, said method further comprising the step of re-testing a scanning signal line in one of said first test blocks.

4. The method according to claim 3, wherein said retesting step comprises the steps of:
    dividing said array substrate into $N_2$ second test blocks, each block including a plurality of scanning signal lines, $N_2$ being an integer of at least two;
    selecting $N_2$ scanning signal lines in total, by selecting a line from each of said second test blocks; and
    simultaneously testing the selected $N_2$ scanning signal lines.

5. The method according to claim 1, further comprising the steps of:
    counting defective scanning signal lines based on a result of said testing;
    re-testing a defective scanning signal line when the count number is less than a predetermined number;
    dividing said array substrate into $N_2$ second test blocks, each block including a plurality of scanning signal lines when the count number is more than the predetermined number, $N_2$ being an integer of at least two except $N_1$;
    selecting $N_2$ scanning signal lines in total, by selecting a line from each of said second test blocks; and simultaneously re-testing the selected $N_2$ scanning signal lines.

6. The method according to claim 1, wherein
    said array substrate further has a plurality of data signal lines crossing said scanning signal lines, and a plurality of elements corresponding to crossing points of said scanning signal lines and said data signal lines, said step of testing comprises the steps of:

sequentially driving the selected scanning signal lines; and detecting data signals sequentially read out to said data signal lines from the corresponding $N_1$ elements by driving the $N_1$ scanning signal lines.

7. The method according to claim 6, wherein said step of driving continues to drive the driven signal line until the next signal line is driven.

8. A device for testing an array substrate having a plurality of data signal lines, a plurality of scanning signal lines crossing said data signal lines, and a plurality of elements corresponding to crossing points of said data signal lines and said scanning signal lines, said device comprising:

a driver for simultaneously driving $N_1$ scanning signal lines among said scanning signal lines, $N_1$ being an integer of at least two; and a detector for detecting a data signal read out to each of said data signal lines from the corresponding $N_1$ elements by driving said $N_1$ scanning signal lines.

9. The device according to claim 8, wherein said driver simultaneously drives $N_2$ scanning signal lines among said scanning signal lines, $N_2$ being not equal to $N_1$ and an integer of at least two, and said detector detects a data signal read out to each of said data signal lines from the corresponding $N_2$ elements by driving said $N_2$ scanning signal lines.

10. The device according to claim 8, wherein $N_1$ is two, said driver re-drives one of the two driven scanning signal lines, and said detector detects a data signal read out to each of said data signal lines from the corresponding one element by driving said one scanning signal line.

* * * * *